US012447907B2

(12) United States Patent
Weinman et al.

(10) Patent No.: US 12,447,907 B2
(45) Date of Patent: Oct. 21, 2025

(54) VEHICLE FRONT CAMERA HOUSING

(71) Applicant: Honda Motor Co., Ltd., Tokyo (JP)

(72) Inventors: Dakota E. Weinman, Dublin, OH (US); Jesse W. Schlabach, Marysville, OH (US); Douglas R. Kaltenmark, Powell, OH (US); Babuji K. Tamarapoo, Powell, OH (US); Hirofumi Takemoto, Dublin, OH (US); Shohan Islam, Columbus, OH (US); Masaki Kawamura, Tochigi (JP); Brian A. Penza, Powell, OH (US); Jamie P. Tabanao, Portland, OR (US); Nicholas H. Goldsberry, Powell, OH (US); Henry Joseph Dicato, Plain City, OH (US); Brian Christopher Bray, Dublin, OH (US); Timothy J. Rupp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 271 days.

(21) Appl. No.: 18/309,220

(22) Filed: Apr. 28, 2023

(65) Prior Publication Data
US 2024/0359636 A1    Oct. 31, 2024

(51) Int. Cl.
*B60R 11/04* (2006.01)
*H04N 23/51* (2023.01)
*H04N 23/57* (2023.01)
*B60R 11/00* (2006.01)

(52) U.S. Cl.
CPC ............. *B60R 11/04* (2013.01); *H04N 23/51* (2023.01); *H04N 23/57* (2023.01); *B60R 2011/004* (2013.01)

(58) Field of Classification Search
CPC ................................ B60R 11/04; H04N 23/57
USPC ..................................................... 348/207.99
See application file for complete search history.

(56) References Cited

U.S. PATENT DOCUMENTS

| 8,671,504 B2 | 3/2014 | Ono et al. |
| 9,278,670 B2 | 3/2016 | Hattori et al. |
| 9,505,382 B2 | 11/2016 | Gokan |
| 9,538,054 B2 | 1/2017 | Hayakawa et al. |

(Continued)

FOREIGN PATENT DOCUMENTS

| CN | 209505699 U | 10/2019 |
| FR | 3106095 B1 | 12/2021 |

(Continued)

*Primary Examiner* — Anthony J Daniels
(74) *Attorney, Agent, or Firm* — Rankin, Hill & Clark LLP; Mark E. Duell

(57) ABSTRACT

A vehicle mounting structure is provided for positioning both an associated camera of an associated vehicle sensor system and an associated fluid nozzle of an associated washer assembly operatively associated with the associated sensor system. The mounting structure includes a housing including an exterior face having a first inner surface portion forming a first opening extending through the face for positioning of the associated camera and a second inner surface portion forming a second opening extended through the face for positioning of the associated nozzle. A diversion feature is extended outwardly from the face. The diversion feature at least partially surrounds the second opening and is adapted to divert associated fluid away from the second opening.

16 Claims, 3 Drawing Sheets

(56) References Cited

U.S. PATENT DOCUMENTS

| | | |
|---|---|---|
| 10,369,972 B2 | 8/2019 | Ghannam et al. |
| 10,442,408 B2 | 10/2019 | Higuchi |
| 11,472,375 B2 | 10/2022 | Zhao et al. |
| 11,491,918 B2 | 11/2022 | Vetter et al. |
| 2016/0247336 A1 | 8/2016 | Walker |
| 2017/0036647 A1* | 2/2017 | Zhao .................. B08B 3/02 |
| 2020/0324738 A1 | 10/2020 | Kubota et al. |
| 2020/0324739 A1* | 10/2020 | Singh ................ B62D 25/085 |
| 2022/0063516 A1 | 3/2022 | Lee et al. |

FOREIGN PATENT DOCUMENTS

| | | |
|---|---|---|
| KR | 1020220029994 A | 3/2022 |
| WO | WO2022008144 A1 | 1/2022 |

* cited by examiner

VEHICLE FRONT CAMERA HOUSING

BACKGROUND

Many vehicles have advanced safety driving support systems which include a sensor system having a front camera and a front radar unit that enable a driver to observe and detect, for example, the distance between the front of the vehicle and adjacent potential obstructions. The front camera can be at least partially hidden by a front grille, and the radar unit can be covered by a manufacturer emblem that is integrated into the front grille. The front camera is typically mounted in a mounting structure or housing provided behind the front grille, and in some instances the mounting structure can also mount a spray nozzle adapted to direct a flow of washer fluid over an outer surface of the emblem and/or the lens of the front camera to remove any obstructing dirt or debris. However, one problem of this type of known mounting structure is that during driving a low pressure area can be created around a base of the nozzle thereby allowing any residual washer fluid to leak out of the nozzle and pool beneath the nozzle. And in sub-freezing temperatures, this pooled washer fluid can freeze allowing for accumulation of ice, and possibly snow, on a face of the mounting structure which can impact visibility of the front camera.

BRIEF DESCRIPTION

According to one aspect, a vehicle mounting structure is provided for positioning both an associated camera of an associated vehicle sensor system and an associated fluid nozzle of an associated washer assembly operatively associated with the associated sensor system. The mounting structure includes a housing including an exterior face having a first inner surface portion forming a first opening extending through the face for positioning of the associated camera and a second inner surface portion forming a second opening extended through the face for positioning of the associated nozzle. A diversion feature is extended outwardly from the face. The diversion feature at least partially surrounds the second opening and is adapted to divert associated fluid away from the second opening.

According to another aspect, a vehicle grille assembly includes a vehicle grille having an interior side and an exterior side, a sensory system including a camera, and a washer assembly including a fluid nozzle. A mounting structure positions both the camera and the fluid nozzle on an interior side of the vehicle grille. The mounting structure includes a housing having a first opening and a second opening each extended through the housing. The mounting structure further includes a diversion feature extended outwardly from the housing and at least partially surrounding the second opening. The camera is positioned in the first opening and the nozzle is positioned in the second opening, and the diversion feature is adapted to divert fluid away from the second opening.

According to another aspect, a vehicle mounting structure is provided for positioning both an associated camera of an associated vehicle sensor system and an associated fluid nozzle of an associated washer assembly operatively associated with the associated sensor system. The mounting structure includes a housing including a first opening extending therethrough for positioning of the associated camera and a second opening extended therethrough for positioning of the associated water nozzle. A protruding structure is formed integral with the housing and is shaped and configured to at least partially surround the second opening. The protruding structure is adapted to divert associated fluid away from the second opening.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or feature's relationship to another element(s) and/or feature(s) as, for example, illustrated in the figures. Moreover, any term of degree used herein, such as "substantially", means a reasonable amount of deviation of the modified word is contemplated such that the end result is not significantly changed.

Figure 1:
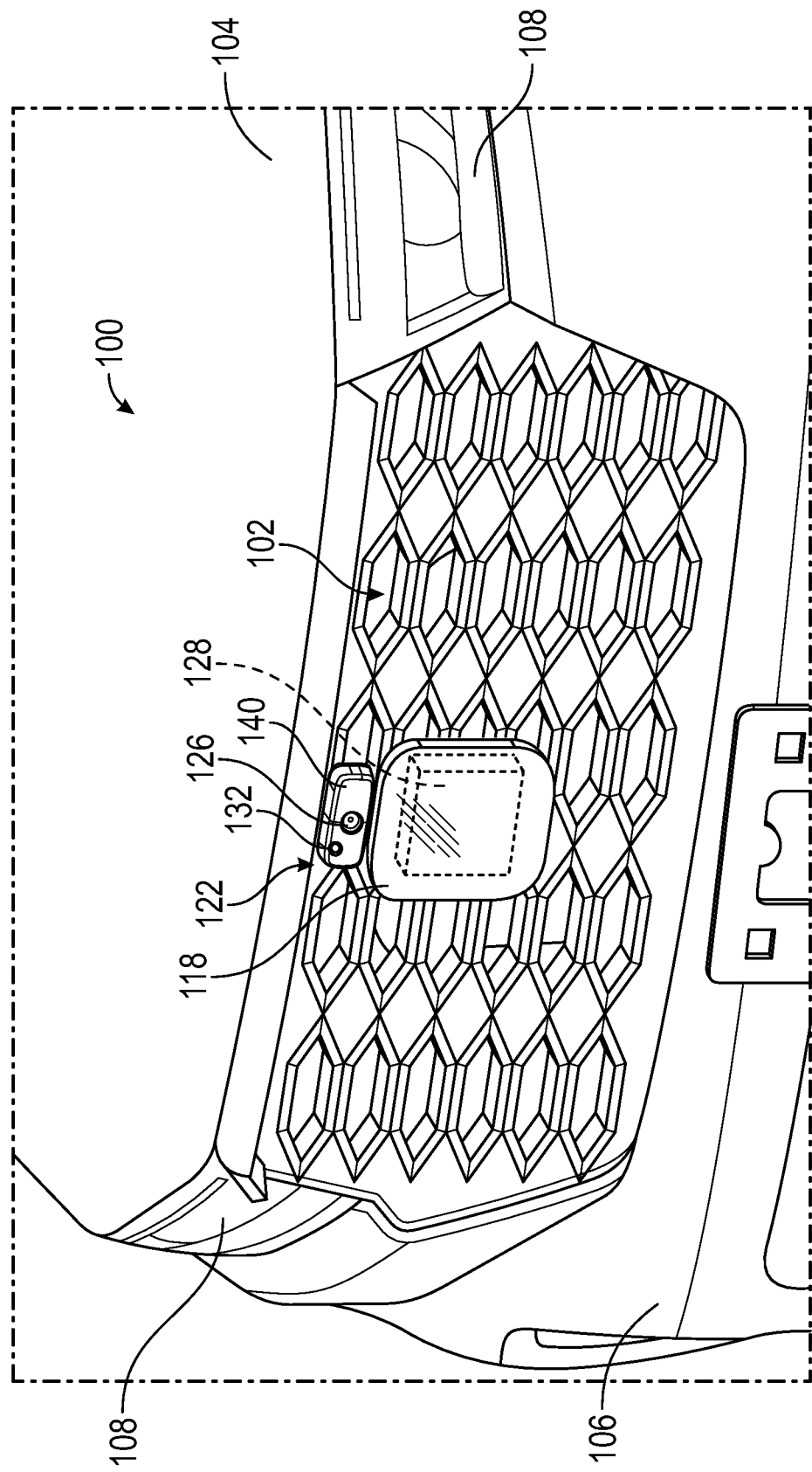
FIG. 1 is a schematic perspective view of a front end portion of a vehicle including a known mounting structure for positioning both a front camera of a vehicle sensor system and a fluid nozzle of a washer assembly operatively associated with the sensor system.

Referring now to the drawings, wherein like numerals refer to like parts throughout the several views, FIG. 1 is a schematic partial perspective view of a front end portion of a known vehicle 100. The vehicle 100 generally includes a front grille assembly 102 and other various conventional elements such as a hood 104, a bumper assembly 106 and headlamp assemblies 108. Because these elements are peripheral to the front grille assembly 102, further description is omitted for the sake of brevity. The front grille assembly 102 include a grille 116 supported to a body structure in a conventional manner. The grille 116 includes an exterior side and an interior side and can be in the form of a lattice. A manufacturer emblem 118 is mounted on the exterior side of the grille.

The front grille assembly 102 further supports components of a sensor assembly 122 provided as part of advanced safety driving support system, such as a collision mitigation braking system or adaptive cruise control. The sensor assembly 122 includes a front camera 126 and a radar unit 128 that enable a driver to observe and detect, for example, the distance between the front of the vehicle and adjacent potential obstructions. The front camera 126 can be at least partially hidden by the front grille 116 and connects to a wiring harness (not shown) within the vehicle 100 and, in turn, connects to an interior video system. As shown, the radar unit 128 can be covered by the emblem 118, which serves to protect the radar unit 128 from damage and adverse weather. When the emblem 118 is used as a cover for the radar unit 128, the emblem 118 is typically formed, at least partially, from a radar-transparent material through which emitted and/or received radar signals are readily transmitted without significant attenuation. The emblem 118 has an exterior surface that may gather dirt and other debris during vehicle use that can interfere with the transmissions of the radar unit 128. Therefore, a washer assembly is provided which includes a spray nozzle 132 that is configured to direct a flow of washer fluid over the exterior surface of the emblem 118 and/or the lens of the front camera 126 to remove any obstructing dirt or debris. The nozzle 132 can be configured to move between a stowed position (FIG. 1) and an operating, extended position (FIG. 3) to clean the exterior surface of the emblem 118 and/or the lens of the front camera 126. For the washer assembly, the nozzle 132 can be fluidly connected to a pump which can fluidly receive washer fluid from a windshield washer system. The windshield washer system holds the washer fluid and the pump (which may also be the same pump as used in the windshield washer system) is actuated to draw the fluid from the windshield washer system and deliver it to the nozzle 132. The pump and nozzle may be configured in combination to deliver a spray of suitable force and coverage to clean the exterior surface of the emblem 118 and/or the lens of the front camera 126.

Figure 2:
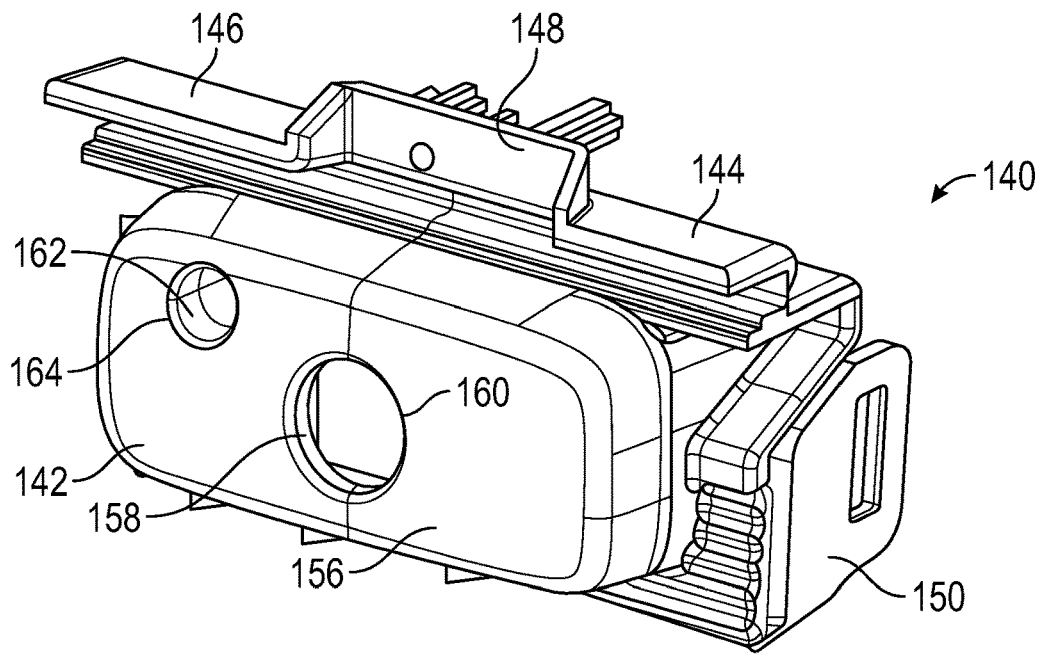
FIG. 2 is a perspective view of the known mounting structure.

The front camera 126 and the nozzle 132 are mounted in a mounting structure 140. With reference to FIG. 2, the known mounting structure 140 includes a housing 142 and a connection feature 144 which secures the mounting structure to the interior side of the front grille 116 and/or surrounding vehicle body structures. The connection feature 144 can include a channel or track 146 extended along an upper portion of the housing 142 that has a mounting flange 148, and can further include a securement tab 150 extended along a side portion of the housing 142. The housing 142 includes an exterior face 156, which can at least partially project outwardly from the exterior side of the front grille 116 as depicted in FIG. 1. The exterior face 156 has a first inner surface portion 158 forming a first opening 160 extending through the face, and a second inner surface portion 162 forming a second opening 164 extended through the face 156. The front camera 126 is securely positioned in the first opening 160, and the nozzle 132 is securely positioned in the second opening 164.

Figure 3:
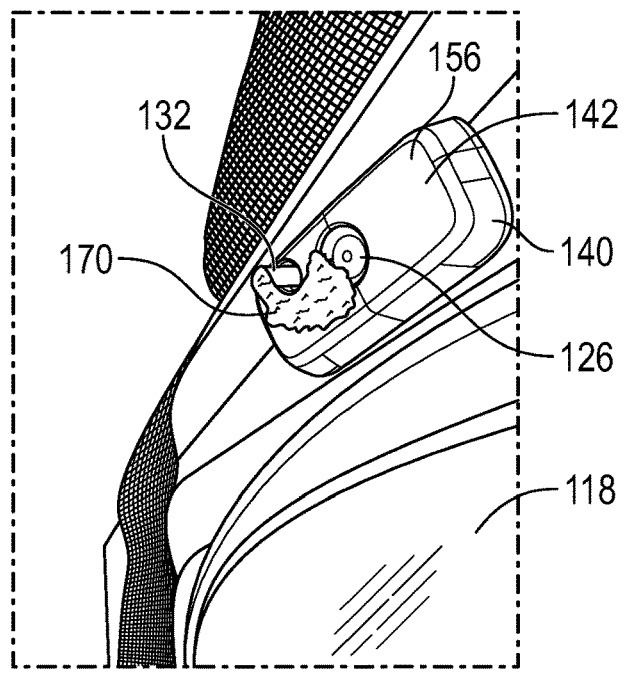
FIG. 3 is a schematic perspective view showing the known mounting structure in sub-freezing temperatures with freezing of pooled washer fluid on an exterior face of the known mounting structure.

One problem of this type of known mounting structure 140 that mounts both the front camera 126 and the spray nozzle 132 is that during driving of the vehicle 100 a low pressure area can be created around a base of the nozzle 132 thereby allowing any residual washer fluid to leak out of the nozzle 132 and pool beneath the nozzle. And in sub-freezing temperatures (<32° F.), as shown in FIG. 3, this pooled washer fluid after mixing with snow can freeze allowing for accumulation of ice 170, and possibly snow, on the exterior face 156 of the mounting structure 140 which can impact visibility of the front camera 126.

Figure 4:
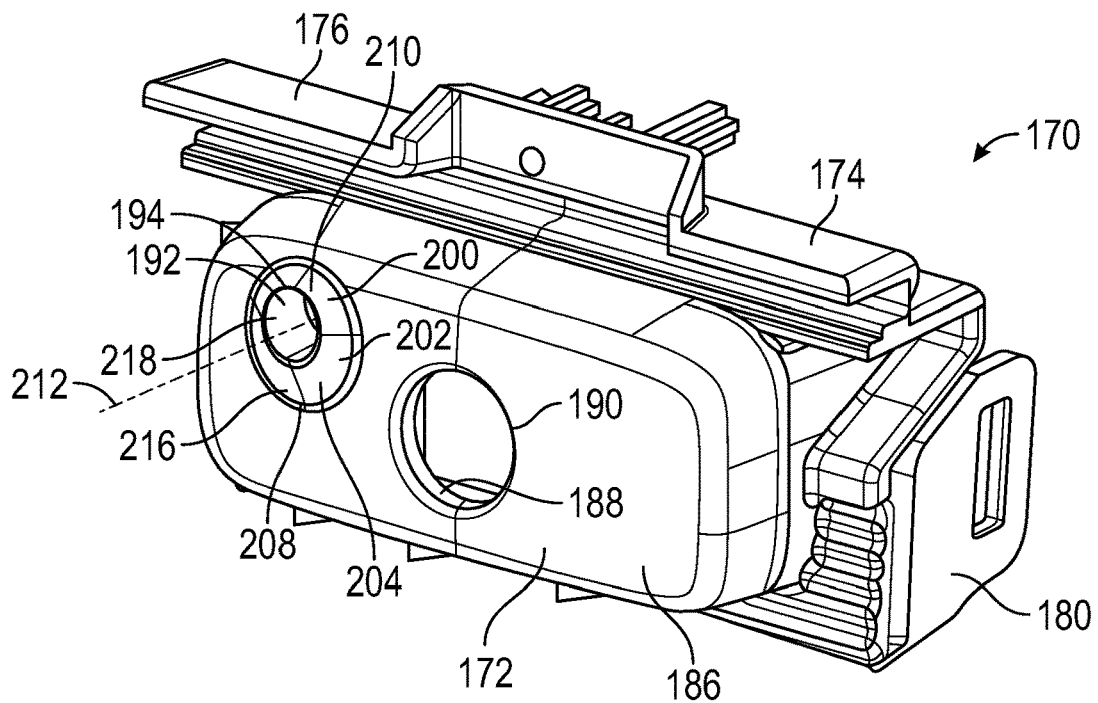
FIG. 4 is a perspective view of a mounting structure according to the present disclosure.
Figure 5:
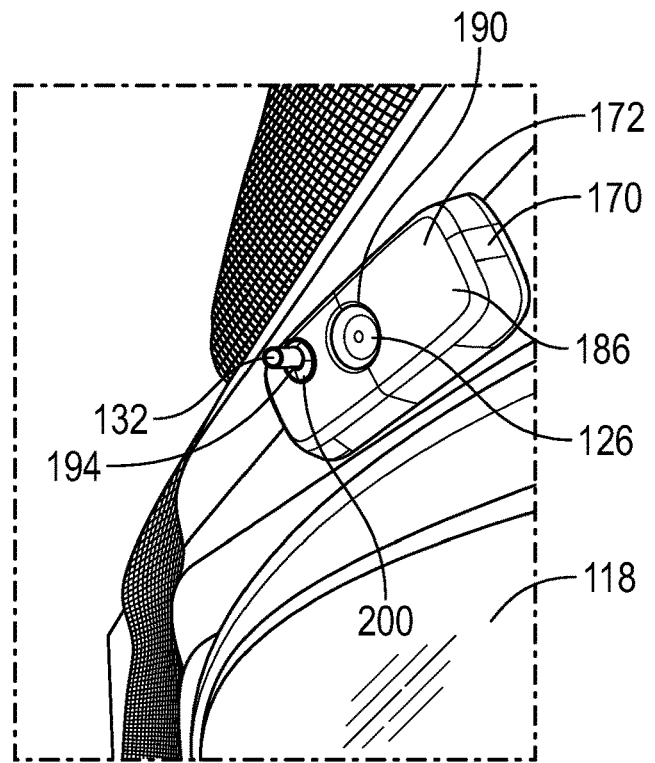
FIG. 5 is a schematic perspective view showing the exemplary mounting structure in sub-freezing temperatures with no freezing of pooled washer fluid on an exterior face of the exemplary mounting structure.

With reference to FIG. 4, a mounting structure 170 according to the present disclosure, which also mounts both the front camera 126 and the spray nozzle 132, is configured to prevent this accumulation of ice, and possibly snow, associated with residual washer fluid from the nozzle 132. As depicted, the exemplary mounting structure 170 can be constructed similar to the known mounting structure 140, and includes a housing 172 and a connection feature 174 which secures the mounting structure 170 to at least the interior side of the front grille 116 and/or surrounding vehicle body structures in a conventional manner. The connection feature 174 can similarly include a channel or track 176 extended along an upper portion of the housing 172 and a securement tab 180 extended along a side portion of the housing 172. The housing 172 includes an exterior face 186. The exterior face 186 has a first inner surface portion 188 forming a first opening 190 extending through the face, and a second inner surface portion 192 forming a second opening 194 extended through the face 186. In FIG. 5, the front camera 126 is securely positioned in the first opening 190, and the nozzle 132 is securely positioned in the second opening 194.

According to the present disclosure, to prevent formation of a low-pressure area around the nozzle 132 which, in turn, eliminates washer fluid stagnation and diverts any remaining washer fluid away from the nozzle to prevent accumulation of ice, and possibly snow, on the exterior face 186 of the housing 172, a diversion feature 200 at least partially surrounds the second opening 194. The exemplary diversion feature 200 is adapted to prevent formation of a low-pressure area on the face 186 at the second opening 194 and is adapted to divert associated washer fluid away from the second opening 194. As shown in FIG. 4, the diversion feature 200 is defined by a protruding structure 202. The protruding structure 202 includes a body 204, and the body 204 has a first edge portion 208 and a second edge portion 210. The first edge portion 208 of the body 204 is located on the face 186 of the housing 172 and is radially spaced from the second opening 194 a first distance relative to a center axis 212 of the second opening. The second edge portion 210 is spaced outwardly from the face 186 and is radially spaced from the second opening 194 a second distance relative to the center axis of the second opening. The second distance is less than the first distance to define a sloping exterior surface 216 of the body 204.

Further, the body 204 of the protruding structure 202 includes the exterior surface 216 and an interior surface 218. As indicated, the exterior surface 216 is sloping or ramped shaped. The interior surface 218 at least partially defines a contiguous extension of the second inner surface portion 192 of the face 186 that defines the second opening 194. Therefore, the second edge portion 210 of the body 204 at least partially defines an entrance of the second opening 194. As indicated, the body 204 of the protruding structure 202 is sized, shaped and configured to at least partially surround the second opening 194, particularly surrounding a lower section of the face 186 about the second opening 194. This arrangement of the body 204 of the protruding structure 202 can also divert residual fluid of the nozzle 132 away from the first opening 190, which is positioned lower on the face 186 than the second opening 194, during driving of the vehicle. In the depicted aspect, the body 204 of the protruding structure 202 is sized, shaped and configured to completely surround the second opening 194, and the body 204 is substantially frustoconical shaped to further divert any fluid away from the second opening 194. It should be appreciated that the diversion feature 200 (i.e., the protruding structure 202) can be formed integral with the housing 172 to define a one-piece mounting structure 170.

Accordingly, the present disclosure provides the diversion feature 200 on the exterior face 186 of the housing 172 around the spray nozzle 132. During driving in sub-freezing temperatures (<32° F.), remaining washer fluid can leak out of the nozzle 132 and pool around the base of the nozzle as described above with the known mounting structure 140. However, in contrast to the known design, the diversion feature 200 provided on the exemplary mounting structure 170 prevents formation of a low-pressure area around the nozzle 132 which, in turn, eliminates fluid stagnation, and the shape of the diversion feature 200 diverts any remaining fluid away from the nozzle. Therefore, with the diversion feature 200, any residual washer fluid from the nozzle 132 does not accumulate on the exterior face 186 of the housing 172. As such, ice buildup around the nozzle 132 is prevented and visibility of the camera 126 is not impacted.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle mounting structure for positioning both an associated camera of an associated vehicle sensor system and an associated fluid nozzle of an associated washer assembly operatively associated with the associated sensor system, the mounting structure comprising:
    a housing including an exterior face having a first inner surface portion forming a first opening extending through the exterior face for positioning of the associated camera and a second inner surface portion forming a second opening extended through the face for positioning of the associated fluid nozzle, wherein extended outwardly from the exterior face is a diversion feature at least partially surrounding the second opening and adapted to divert associated fluid away from the second opening,
    wherein the diversion feature is adapted to prevent formation of a low-pressure area on the exterior face at the second opening.

2. The vehicle mounting structure of claim 1, wherein the diversion feature is defined by a protruding structure, the protruding structure including a body having a first edge portion and a second edge portion, the first edge portion located on the exterior face and radially spaced from the second opening a first distance relative to a center axis of the second opening, the second edge portion spaced from the exterior face and radially spaced from the second opening a second distance relative to the center axis of the second opening, the second distance less than the first distance.

3. The vehicle mounting structure of claim 2, wherein the second edge portion at least partially defines an entrance of the second opening.

4. The vehicle mounting structure of claim 2, wherein the body of the protruding structure includes an exterior surface and an interior surface, the interior surface at least partially defining a contiguous extension of the second inner surface portion of the exterior face.

5. The vehicle mounting structure of claim 4, wherein the exterior surface is ramped shaped.

6. The vehicle mounting structure of claim 2, wherein the body of the protruding structure is shaped and configured to surround the second opening.

7. The vehicle mounting structure of claim 1, wherein the diversion feature is shaped and configured to surround the second opening and is substantially frustoconical shaped.

8. The vehicle mounting structure of claim 1, wherein the diversion feature is integral with the housing to define a one-piece mounting structure.

9. A vehicle grille assembly comprising:
    a vehicle grille having an interior side and an exterior side;
    a sensory system including a camera;
    a washer assembly including a fluid nozzle; and
    a mounting structure for positioning both the camera and the fluid nozzle on the interior side of the vehicle grille, the mounting structure including a housing having a first opening and a second opening each extended through the housing, and a diversion feature extended outwardly from the housing and at least partially surrounding the second opening,
    wherein the camera is positioned in the first opening and the fluid nozzle is positioned in the second opening, and the diversion feature is adapted to divert fluid away from the second opening.

10. The vehicle grille assembly of claim 9, wherein the diversion feature is adapted to prevent formation of a low-pressure area on an exterior face of the housing at the second opening.

11. The vehicle grille assembly of claim 9, wherein diversion feature is a protruding structure located on an exterior face of the housing, the protruding structure includes a body having an exterior surface and an interior surface, the interior surface at least partially defining the second opening for the fluid nozzle.

12. The vehicle grille assembly of claim 11, wherein the body of the protruding structure is sized and configured to surround the second opening.

13. The vehicle grille assembly of claim 9, wherein diversion feature is a protruding structure located on an exterior face of the housing, the protruding structure includes a body sized and configured to surround the second opening, wherein the body is substantially frustoconical shaped.

14. The vehicle grille assembly of claim 13, wherein the protruding structure is adapted to prevent ice buildup at least partially around the fluid nozzle.

15. A vehicle mounting structure for positioning both an associated camera of an associated vehicle sensor system and an associated fluid nozzle of an associated washer assembly operatively associated with the associated sensor system, the mounting structure comprising:
    a housing including a first opening extending therethrough for positioning of the associated camera and a second opening extended therethrough for positioning of the associated fluid nozzle, and a protruding structure formed integral with the housing and shaped and configured to at least partially surround the second opening, the protruding structure adapted to divert associated fluid away from the second opening,
    wherein the protruding structure includes a body having an exterior surface and an interior surface, the exterior surface is ramp shaped, the interior surface at least partially defining the second opening.

16. The vehicle mounting structure of claim 15, wherein the body of the protruding structure is substantially frustoconical shaped.

* * * * *